United States Patent

[11] 3,608,923

[72] Inventors William J. Houfek, Sr.
136 Fairway Drive;
William J. Houfek, Jr., Rt. 3, Box 1011,
both of Albany, Oreg. 97321
[21] Appl. No. 828,870
[22] Filed May 29, 1969
[45] Patented Sept. 28, 1971

[54] MEANS RESTORING AN AXLE TO HORIZONTAL POSITION UPON TIRE DEFLATION AT EITHER END THEREOF
1 Claim, 6 Drawing Figs.

[52] U.S. Cl. .................................................. 280/104.5,
180/22 D
[51] Int. Cl. ..................................................... B60g 19/10
[50] Field of Search ........................................ 280/104.5;
180/22 D, 22 E

[56] References Cited
UNITED STATES PATENTS
3,096,995 7/1963 Richnau ....................... 180/22 D

*Primary Examiner*—Philip Goodman
*Attorney*—James D. Givnan

ABSTRACT: A device for selectively engaging and holding either end of an axle in a tandem axle and spring assembly to compensate for the lowering or dropping of that end of the axle due to deflation of its respective pneumatic tire. The device comprises a hook swingably depending from the frame or chassis of the vehicle and adapted for holding engagement with the axle after said end thereof has been jacked up or elevated to restore it to its normal horizontal position.

PATENTED SEP28 1971 3,608,923
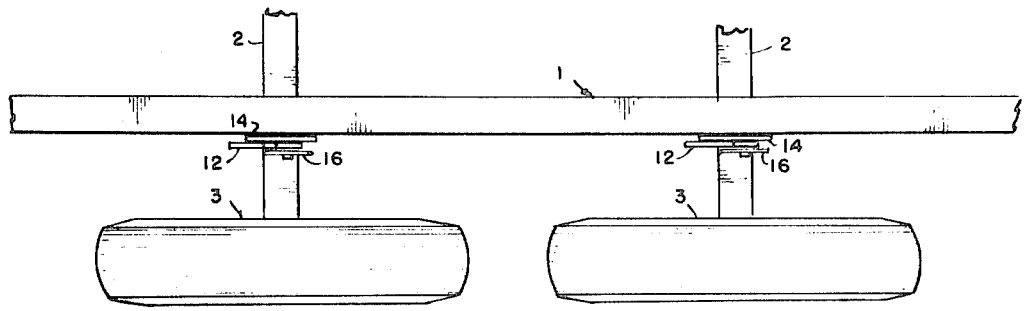
Fig. 1
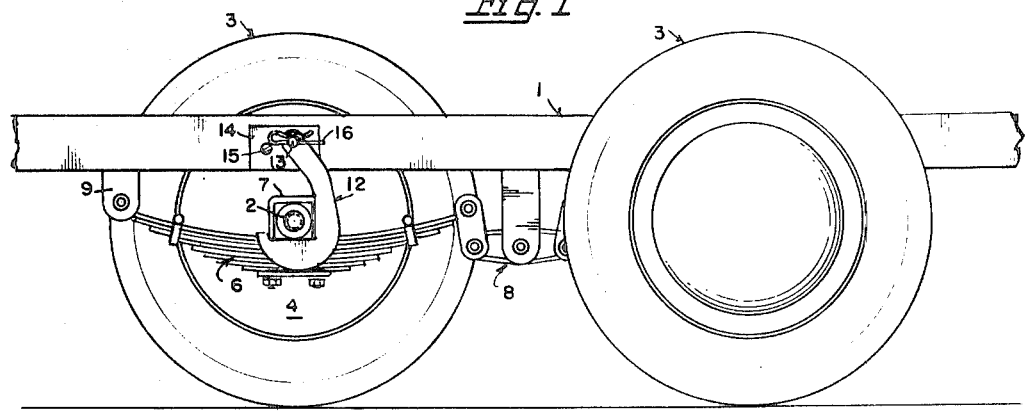
Fig. 2
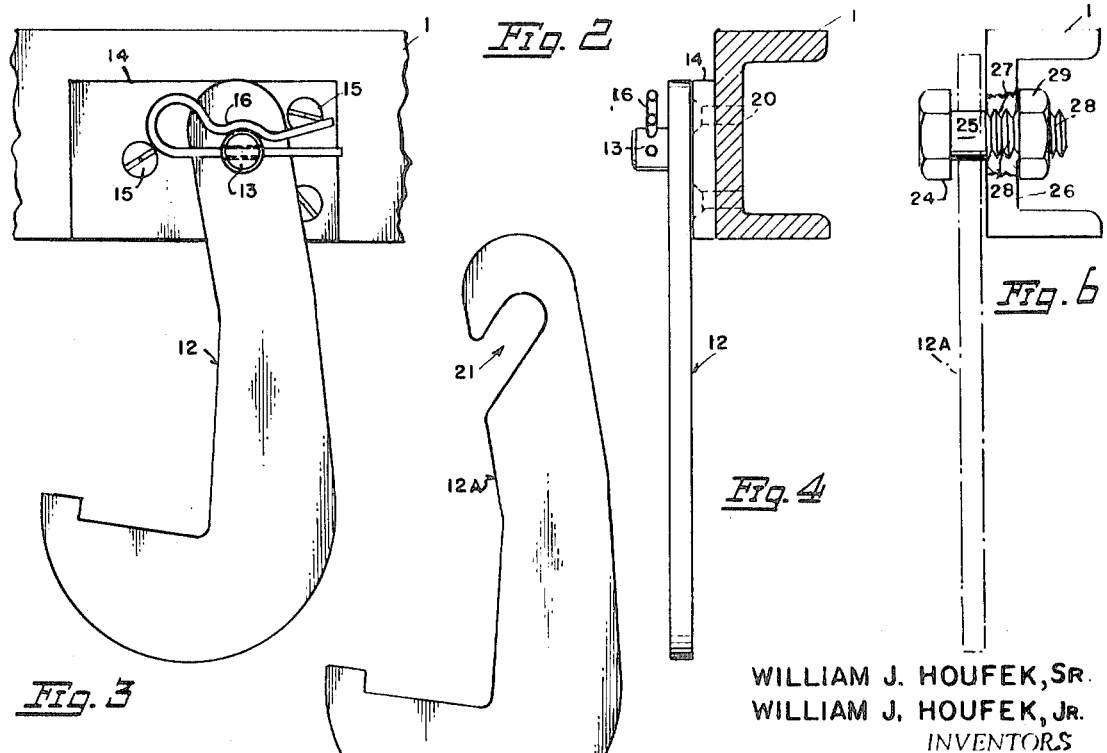
Fig. 3   Fig. 4   Fig. 6
Fig. 5
WILLIAM J. HOUFEK, SR.
WILLIAM J. HOUFEK, JR.
INVENTORS
BY 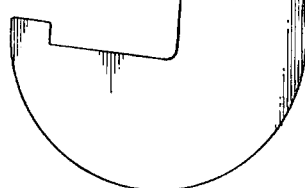
ATT'Y

MEANS RESTORING AN AXLE TO HORIZONTAL POSITION UPON TIRE DEFLATION AT EITHER END THEREOF

The principal objects of the invention are:

To provide a device of the character described for use in restoring an axle to its normal horizontal position in the event of tire deflation.

To provide an axle-supporting device as above described which is of simple, efficient, durable and inexpensive construction, easy to install, convenient to operate and one which is positive in holding engagement with the axle to maintain it in a normal horizontal position against road shock during further vehicle travel to a point of tire repair or wheel replacement.

To provide an axle support adapted, though not restrictively, for use on house trailers, trailer trucks, and similar vehicles, whose undercarriage includes spring-suspended axles and idling wheels equipped with pneumatic tires.

The foregoing and other objects and advantages which will become subsequently apparent reside in the details of construction and operation as more fully hereinafter described and claimed, reference being had to the accompanying drawing forming a part hereof and in which:

FIG. 1 is a fragmentary top plan view exemplary of either side of the undercarriage of a trailer vehicle equipped with idling wheels and pneumatic tires carried by tandem axles provided with axle supports made and installed in accordance with our invention.

FIG. 2 is an elevational view of FIG. 1 with one wheel removed to illustrate the support in holding engagement with one of the axles.

FIG. 3 is a side elevational view of the support, on an enlarged scale, and means permanently secured to the vehicle frame for swingably suspending the support.

FIG. 4 is an end elevational view of FIG. 3.

FIG. 5 is an elevational view of a modified form of support.

FIG. 6 is a view similar to FIG. 4 showing means for swingably attaching the modified form of support to the vehicle frame.

With continuing reference to the drawing wherein like reference numerals designate like parts, numeral 1 indicates generally the side frame members of a trailer vehicle, 2 the tandem axles thereof and 3 ground-engaging pneumatic tires mounted on idling wheels 4 rotatably carried by the axles.

The axles are identical and may be of square section, as shown, or of round section or that of an I-beam, and secured to springs 6 by shackle bolts 7. The adjacent ends of the two aligned springs under each frame member 1 are connected to an equalizer, indicated generally at 8, secured to and depending from the vehicle frame, as shown, and the opposite ends of the springs are attached to the frame by hangers 9. The undercarriage thus far described is of conventional design.

As best illustrated in FIGS. 3 and 4, the support indicated generally at 12 is of hook formation with its top end swingably attached to a stud 13 extending outwardly from a plate 14 bolted as at 15 or welded or otherwise permanently secured in any suitable manner to the outside of its respective frame member 1. Each hinge connection 13 of the hooks 12 is in direct vertical alignment with its respective subjacent axle as shown.

The hook is maintained on the stud 13 by a spring cotter pin 16 so that the hook may be quickly and conveniently attached for its intended purpose or removed when not needed.

The plate 14 is preferably secured to its respective frame member 1 by flathead bolts 15, as shown, which when driven home are flush with the outside surface of the plate so as not to interfere with movement of the hook 12 about the stud 13 when swinging the hook into or out of engagement with its respective axle. If desired the bolts 15 could be eliminated by welding the plates directly to the frame members.

With reference to FIG. 5 it will be seen that the top end portion of the shank of the modified form of support 12A may be provided with a downwardly inclined, outwardly opening slot 21 for convenient engagement with the stud 13.

In the modification shown in FIG. 6 we substitute a headed bolt 24 for the stud 13 and plate 14 shown in the first form. The web 26 of the channel frame member 1 is drilled and tapped as at 27 to accommodate the threaded end 28 of the bolt which extends through the flange and is provided with a locknut 29 for securing the bolt permanently in place. By this arrangement the top hook end (21) of the modified support 12A may be quickly and conveniently attached to the bolt between the head thereof and the opposing face of the frame with the head of the bolt substituting for the cotter pin 16.

The plates 14 and studs 13, or the bolts 24 are permanently secured to the outside of the vehicle frame members and the support members 12 or 12A are carried within the vehicle until ready for use.

When either end of any of the axles 2 drops to a lower level because of tire deflation, it is merely necessary to jack up that end of the axle to an elevation slightly higher than its normal position when the tire is fully inflated. Either form of support 12 or 12A is then attached to either stud 13 or bolt 24 and swung under the axle. Following this the jack is lowered until the axle comes to rest in supporting engagement with the bottom hooked end of the support.

Any bouncing motion imparted to or road shock absorbed by the remaining wheel on one end of the axle would not disturb the hingelike support of its hooked opposite end.

What we claim is:

1. In a vehicle having a chassis including longitudinal frame members, spring-suspended tandem axles and inflated pneumatic-tired ground-engaging wheels rotatably carried by the axles; the improvement comprising,
    rigid members swingably attached to said frame members and adapted for selective engagement with said axles to hold the same in a normal position substantially parallel to the horizontal plane of said frame members upon deflation of the vehicle tires, and
    said rigid members being of hook shape at their top and bottom ends for attachment respectively to said frame members, and to said axles.